(12) United States Patent
Modzel

(10) Patent No.: US 12,313,196 B1
(45) Date of Patent: May 27, 2025

(54) CLAMP FOR A PIPE

(71) Applicant: Ford Global Technologies, LLC, Dearborn, MI (US)

(72) Inventor: John Paul Modzel, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/588,755

(22) Filed: Feb. 27, 2024

(51) Int. Cl.
*F16L 3/12* (2006.01)
*F16L 3/10* (2006.01)
*F16L 3/123* (2006.01)

(52) U.S. Cl.
CPC ........... *F16L 3/1222* (2013.01); *F16L 3/1091* (2013.01); *F16L 3/123* (2013.01)

(58) Field of Classification Search
CPC ....... F16L 3/1222; F16L 3/1091; F16L 3/123; F16L 3/1066; F16L 3/105; F16L 3/1008; F16L 33/08; F16B 2/246
See application file for complete search history.

(56) References Cited

U.S. PATENT DOCUMENTS

| | | | | |
|---|---|---|---|---|
| 1,806,176 | A * | 5/1931 | Owens | F16L 3/1008 248/56 |
| 4,691,945 | A * | 9/1987 | Cottrell | F23J 13/04 285/903 |
| 7,097,141 | B2 * | 8/2006 | Heath | F16B 2/10 248/62 |
| 7,467,767 | B2 * | 12/2008 | Miles | F16L 3/1008 248/62 |
| 9,889,327 | B2 | 2/2018 | Mitchell et al. | |
| 10,900,593 | B2 * | 1/2021 | Jones | H02G 3/32 |
| 11,306,855 | B2 * | 4/2022 | Melni | F16L 21/08 |
| 11,953,130 | B2 * | 4/2024 | Lofgren | B21D 39/046 |
| 2018/0087693 | A1 | 3/2018 | Dhanasekaran et al. | |
| 2022/0057021 | A1 | 2/2022 | Budziszek et al. | |
| 2023/0046790 | A1 * | 2/2023 | Lofgren | F16L 3/1233 |
| 2023/0228351 | A1 * | 7/2023 | Belen | F16L 21/005 285/420 |
| 2024/0068605 | A1 * | 2/2024 | Ohnemus | F16L 23/22 |
| 2024/0117896 | A1 * | 4/2024 | Jaeger | F16L 3/1211 |

* cited by examiner

Primary Examiner — Eret C McNichols
(74) Attorney, Agent, or Firm — Burris Law, PLLC

(57) ABSTRACT

A clamp for a pipe including a first leg and a second leg. The first leg has an arcuate shape and includes a first proximal end, a first distal end spaced apart from the first proximal end along an axial direction of the central axis, and at least one groove formed in a first surface of the first leg between the first proximal end and the first distal end. The second leg has an arcuate shape and includes a second proximal end proximate the first proximal end of the first leg and a second distal end proximate the first distal end of the first leg. The second distal end is spaced apart from the second proximal end along the axial direction of the central axis. A portion of the second leg is disposed within the groove of the first leg to interlock the first and second legs to each other.

20 Claims, 9 Drawing Sheets

CLAMP FOR A PIPE

FIELD

The present disclosure relates to a clamp for a pipe.

BACKGROUND

The statements in this section merely provide background information related to the present disclosure and may not constitute prior art.

Clamps are used to connect one or more pipes of a pipe assembly to each other and/or to a structure. In one example, a clamp may include two C-shaped bodies that wrap around first and/or second pipes to secure the first and second pipes to each other. In another example, the clamp may include a body that wraps around a pipe to secure the pipe to a structure. A clamping force of traditional clamps may be unevenly distributed around a portion of the pipe, which may lead to movement of the pipe within the clamp.

The present disclosure addresses these and other issues related to securing one or more pipes to each other and/or to a structure using clamps.

SUMMARY

This section provides a general summary of the disclosure and is not a comprehensive disclosure of its full scope or all of its features.

In one form, the present disclosure provides a clamp for a pipe. The clamp includes a first leg and a second leg. The first leg has an arcuate shape disposed about a central axis of the clamp and includes a first proximal end, a first distal end spaced apart from the first proximal end along an axial direction of the central axis, and at least one first groove formed in a first surface of the first leg between the first proximal end and the first distal end. The second leg has an arcuate shape disposed about the central axis and includes a second proximal end proximate the first proximal end of the first leg and a second distal end proximate the first distal end of the first leg. The second distal end is spaced apart from the second proximal end along the axial direction of the central axis. A portion of the second leg is disposed within the first groove of the first leg to interlock the first and second legs to each other.

In variations of the clamp of the above paragraph, which can be implemented individually or in any combination: the first leg and the second leg are movable independent of each other; each of the first and second legs includes at least two revolutions about the central axis of the clamp; the first proximal end extends from the second proximal end; a first tab extends outward from the first distal end and a second tab extends outward from the second distal end; a fastener extends through the first tab and the second tab; a first tab extends outward from the first distal end and a second tab extends outward from the second distal end; a third tab extends outward from the first proximal end and a fourth tab extends outward from the second proximal end; a first fastener extends through the first tab and the second tab; a second fastener extends through the third tab and the fourth tab; each of the first and second legs includes a variable thickness; each of the first and second legs is a resiliently flexible; a first inner surface of the first leg and a second inner surface of the second leg cooperate to form a substantially cylindrical opening coaxial with the central axis; and at least one second groove is formed in a second surface of the second leg between the second proximal end and the second distal end, a portion of the first leg is disposed within the at least one second groove to further interlock the first and second legs to each other.

In another form, the present disclosure provides a clamp for a pipe that includes a first leg and a second leg. The first leg has a first helical shape and includes a first proximal end, a first distal end, and a plurality first grooves formed in a first surface of the first leg between the first proximal end and the first distal end. The second leg has a second helical shape and includes a second proximal end proximate the first proximal end of the first leg, a second distal end proximate the first distal end of the first leg, and a plurality of second grooves formed in a second surface of the second leg between the second proximal end and the second distal end. Portions of the second leg are disposed within the plurality of first grooves and portions of the first leg are disposed within the plurality of second grooves to interlock the first and second legs to each other.

In variations of the clamp of the above paragraph, which can be implemented individually or in any combination: each of the first and second legs includes at least two revolutions about a central axis of the clamp; the first proximal end extends from the second proximal end; a first tab extends outward from the first distal end and a second tab extends outward from the second distal end; a fastener extends through the first tab and the second tab; the plurality of first grooves are formed in an inner surface of the first leg; the plurality of second grooves are formed in an outer surface of the second leg; and each of the first and second legs includes a constant helical pitch.

In another form, the present disclosure provides a clamp for a pipe that includes a first leg, a second leg, a fastener. The first leg has a first helical shape and includes a first proximal end, a first distal end, and a plurality first grooves formed in an inner surface of the first leg between the first proximal end and the first distal end. The first leg further includes a first tab extending outward from the first distal end. The second leg has a second helical shape and includes a second proximal end extending from the first proximal end of the first leg, a second distal end proximate the first distal end of the first leg, and a plurality of second grooves formed in an outer surface of the second leg between the second proximal end and the second distal end. The second leg further includes a second tab extending outward from the second distal end. The fastener extends through the first tab and the second tab. Portions of the second leg are disposed within the plurality of first grooves and portions of the first leg are disposed within the plurality of second grooves to interlock the first and second legs to each other.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
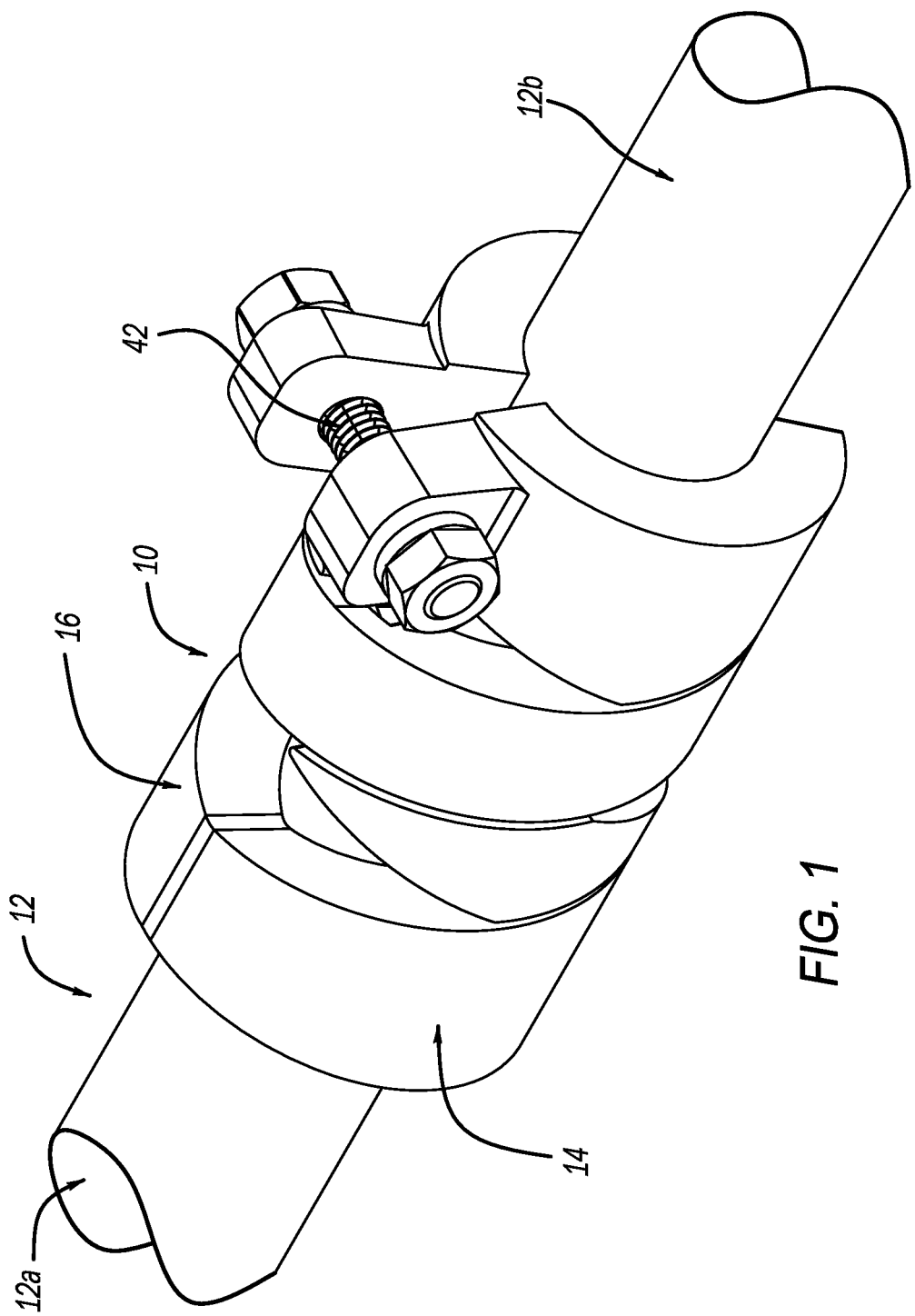
FIG. 1 is a perspective view of a clamp securing a pipe assembly according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a clamp 10 is shown securing a pipe assembly 12. In the example illustrated, the pipe assembly 12 includes a first pipe 12a and a second pipe 12b that are secured to each other using the clamp 10. In some forms, the clamp 10 may secure a pipe assembly together that includes 3 or more pipes. In the example illustrated, the first pipe 12a and the second pipe 12b are axially aligned with each other. In some forms, the first pipe 12a may be secured to the second pipe 12b via the clamp 10 and disposed at an angle relative to the second pipe 12b (acuate angle or obtuse angle, for example). In the example illustrated, the first pipe 12a and the second pipe 12b have a cylindrical shape. In some forms, the first pipe 12a and the second pipe 12b may be secured to each other using the clamp 10 and may have a rectangular shape, square shape, or any other suitable shape.

The clamp 10 is in the form of a single unitized, monolithic body that can be manufactured by an additive manufacturing process and secured to the pipe assembly 12. The manufacturing process can include laser sintering, for example, that can generally include a laser (not shown), a device (not shown) for applying subsequent layers of powdered sintering material (e.g., polyamide powder), and a controller (not shown) that controls operation of the laser and the amount and timing of the deposition of the polyamide powder. It should be understood that other 3D printing or additive manufacturing methods may be employed to achieve the unitized, monolithic body, along with a variety of different materials, while remaining within the scope of the present disclosure. In some configurations, the clamp 10 may be made of separate parts that are secured to each other. In such configurations, one or more of the individual parts of the clamp 10 may be manufactured by an additive manufacturing process.

Figure 2:
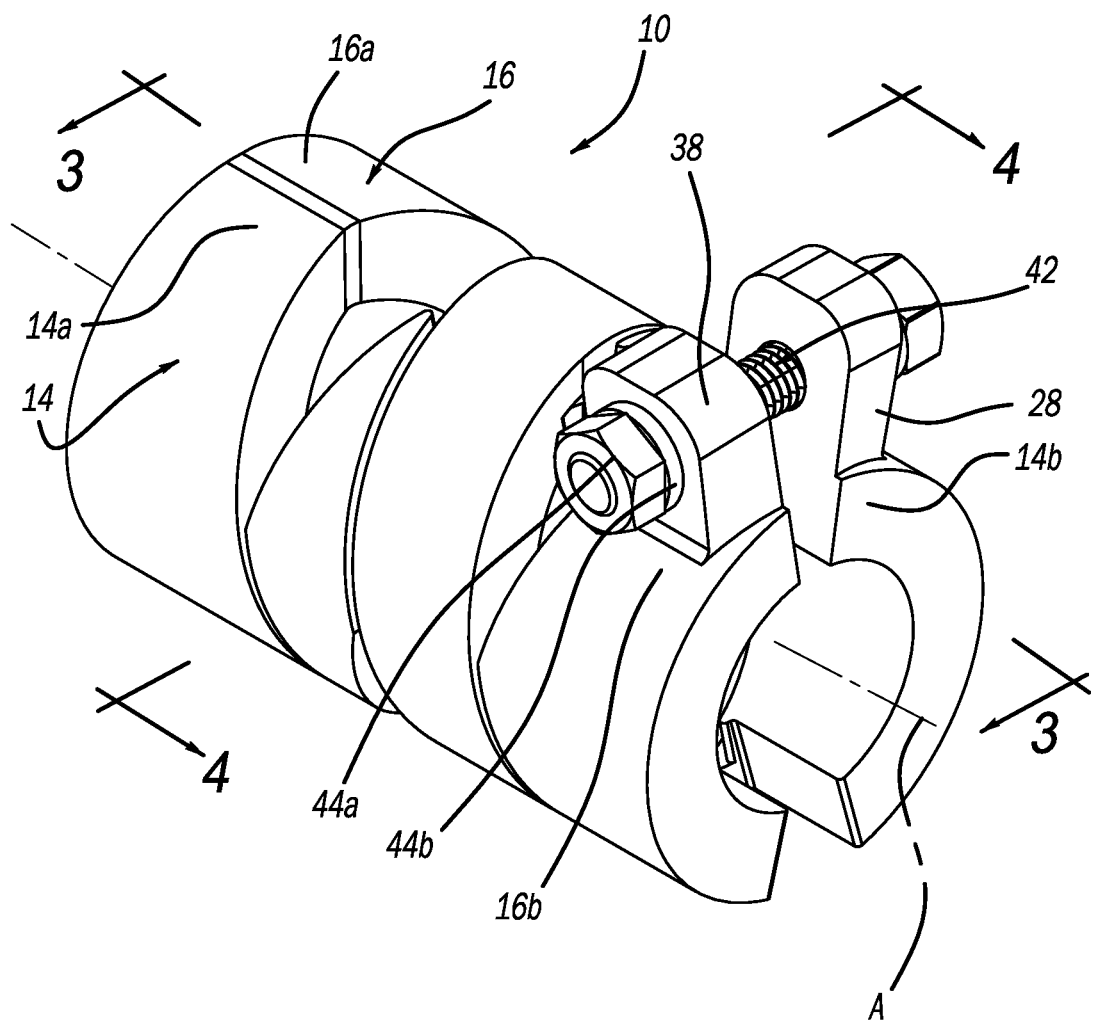
FIG. 2 is a perspective view of the clamp of FIG. 1.
Figure 3:
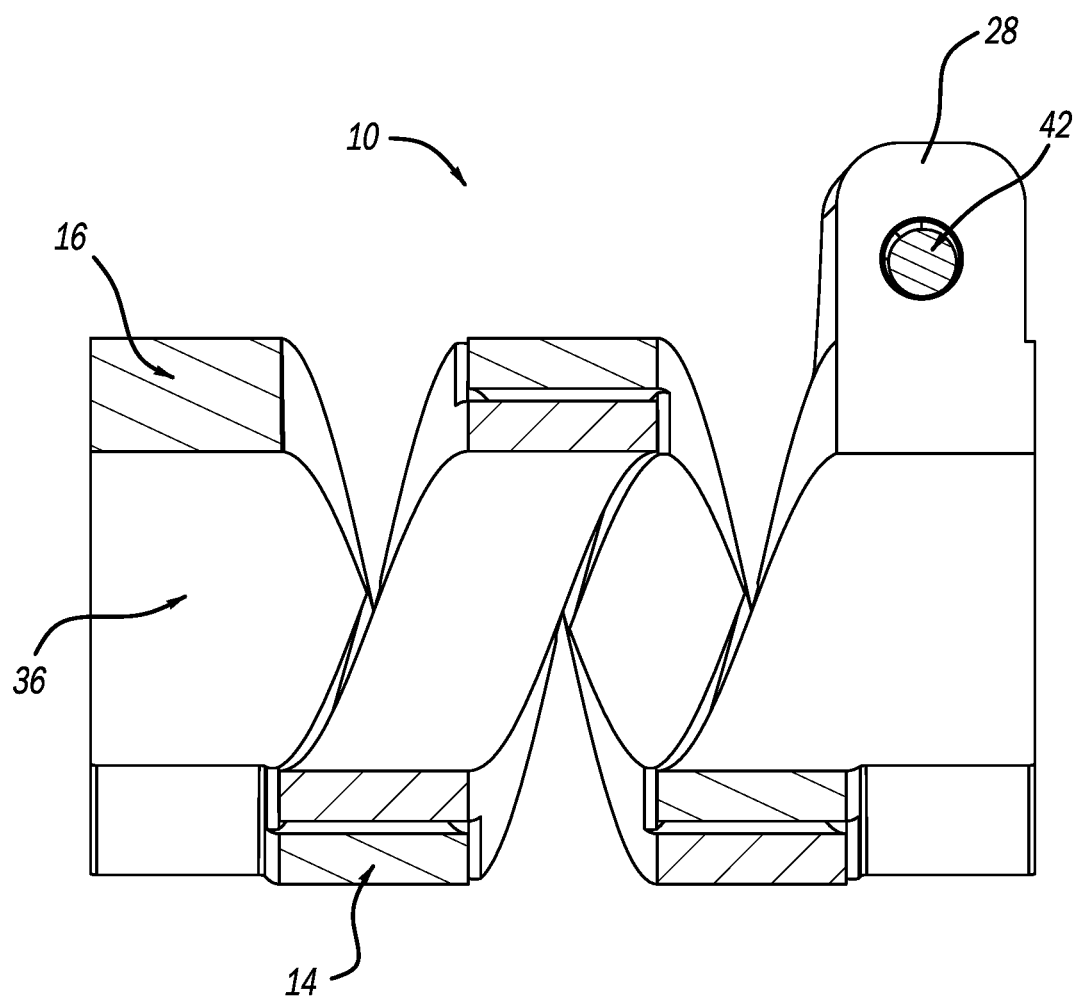
FIG. 3 is a cross-sectional view of the clamp of FIG. 1 taken along line 3-3 of FIG. 2.
Figure 4:
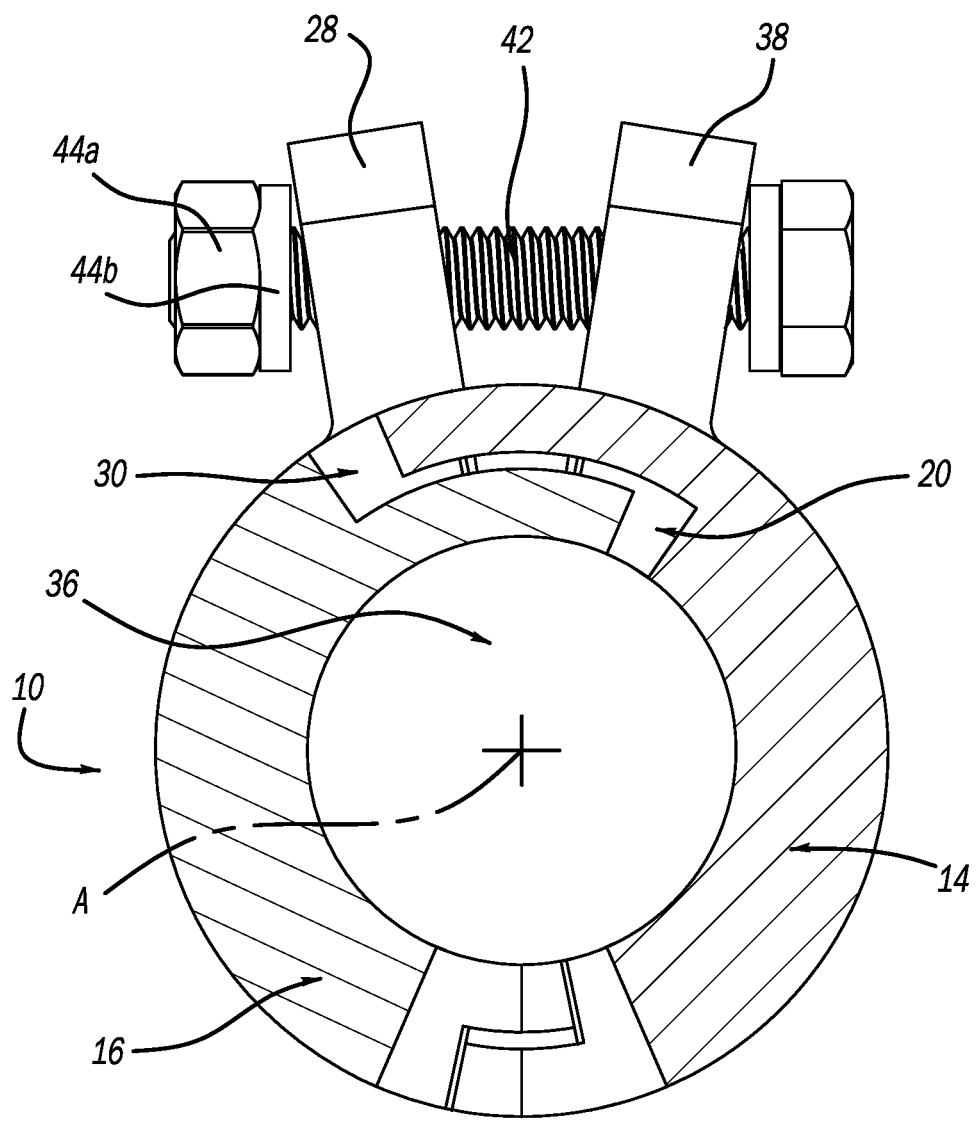
FIG. 4 is a cross-sectional view of the clamp of FIG. 1 taken along line 4-4 of FIG. 2.

With additional reference to FIGS. 2-4, the clamp 10 includes a first leg 14 and a second leg 16 that wrap around the pipe assembly 12 to secure the first pipe 12a of the pipe assembly 12 to the second pipe 12b of the pipe assembly 12. The first leg 14 and the second leg 16 interlock and intertwine with each other to secure the pipe assembly 12 as will be described in greater detail below. In one example, the first leg 14 and the second leg 16 interlock with each other at a plurality of locations along a length of the clamp 10. In another example, the first leg 14 and the second leg 16 interlock with each other at at least one location along the length of the clamp 10.

Figure 5:
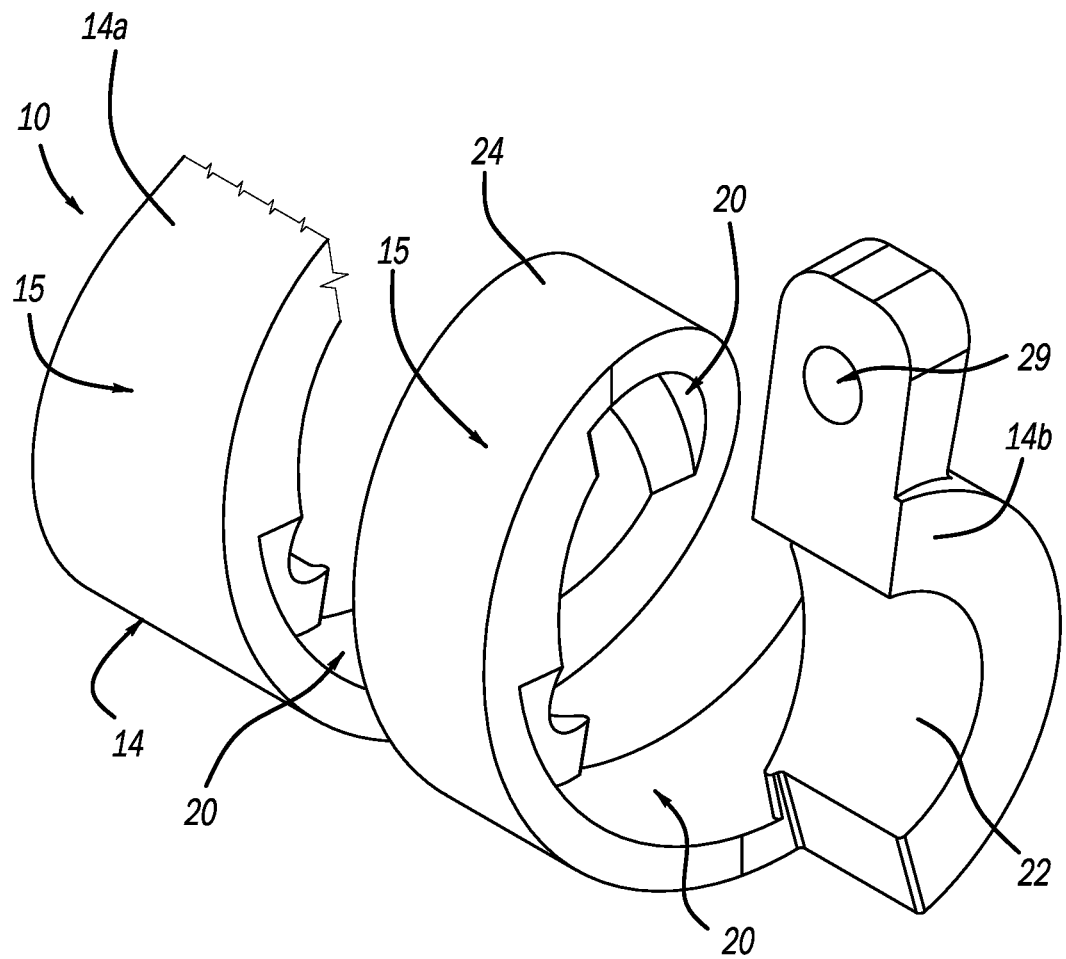
FIG. 5 is a perspective view of the clamp of FIG. 1 with one of its legs hidden for clarity.
Figure 7:
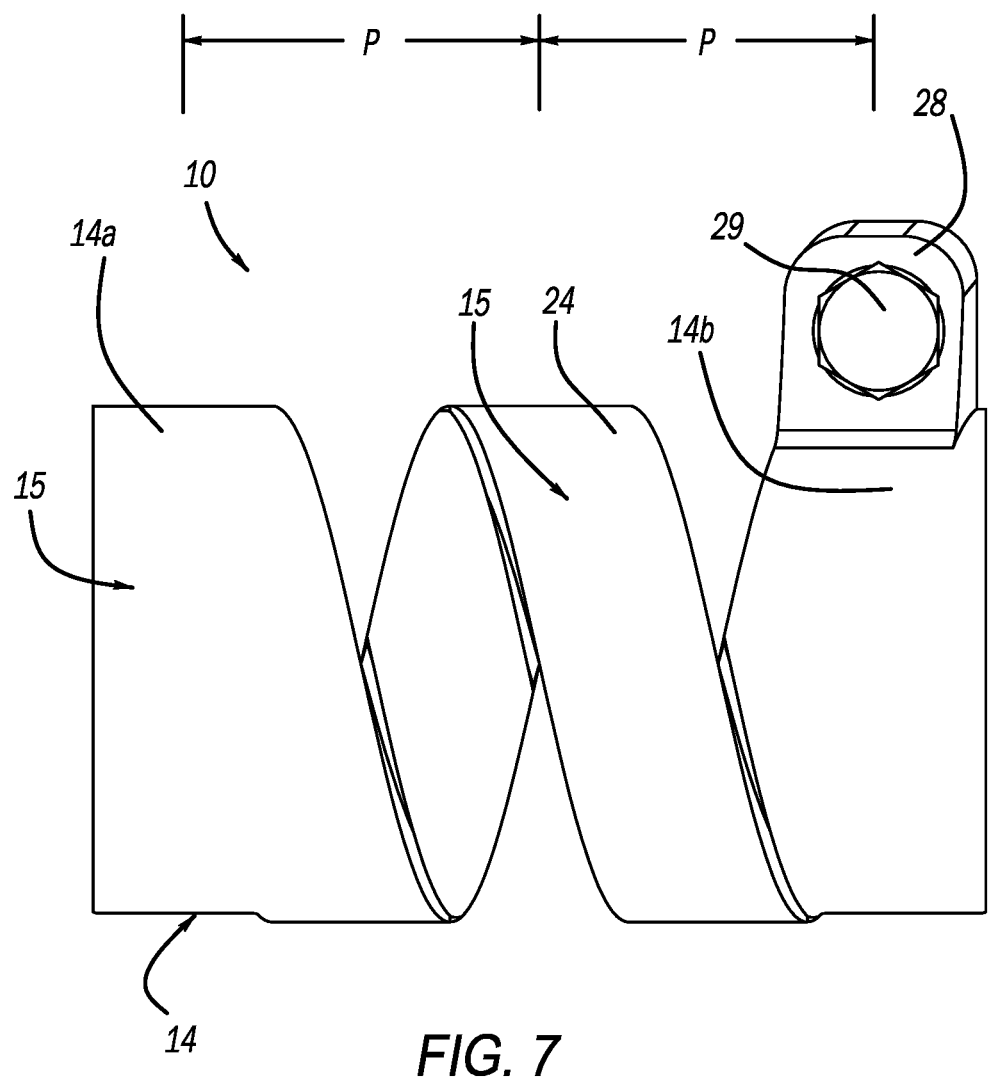
FIG. 7 is a side view of the portion of the clamp of FIG. 1 shown in FIG. 5.

With reference to FIGS. 5 and 7, the first leg 14 has an arcuate shape and is resiliently flexible. Stated differently, the first leg 14 has a helical shape formed by a plurality of continuous windings 15 arranged in series. In some forms, the plurality of continuous windings 15 includes at least two windings forming at least two revolutions about a central axis A of the clamp 10 or substantially two revolutions. The first leg 14 also includes a proximal end 14a and a distal end 14b that is spaced apart from the proximal end 14a along an axial direction of the central axis A. The helical shaped first leg 14 includes a constant helical pitch P (FIG. 7) from the proximal end 14a to the distal end 14b. In some forms, the helical shaped first leg 14 may include a variable pitch. That is, in one example, the pitch between the windings 15 at the proximal end 14a may be greater than the pitch between the windings 15 at the distal end 14b. In another example, the pitch between the windings 15 at or near a center portion of the first leg 14 may be greater than the pitch between the windings 15 at the proximal and distal ends 14a, 14b.

The first leg 14 also includes a plurality of grooves 20 formed therein between the proximal end 14a and the distal end 14b. In this way, the first leg 14 has a variable thickness from the proximal end 14a to the distal end 14b. In the example illustrated, a circumferential surface of each winding 15 of the first leg 14 includes at least one groove 20 formed therein. The grooves 20 may be formed at different locations of the windings 15. That is, one groove 20 may be formed in one winding 15 of the first leg 14 at one location along the circumferential surface and another groove 20 may be formed in another winding 15 of the first leg 14 at another location along the circumferential surface that is different from the location of the one winding 15. A groove 20 may optionally span more than one of the windings 15, such as portions of adjacent windings 15. In the example illustrated, the circumferential surface is an inner circumferential surface referred to herein as an inner surface 22. In other words, the plurality of grooves 20 are formed in the inner surface 22 of the windings 15 of the first leg 14 that faces the pipe assembly 12. In some forms, the plurality of grooves 20 may be formed in an outer circumferential surface (i.e., an outer surface 24) of the windings 15 of the first leg 14 that faces away from the pipe assembly 12. A tab 28 extends outward in a radial direction from the distal end 14b of the first leg 14 and includes an aperture 29 formed therein.

Figure 6:
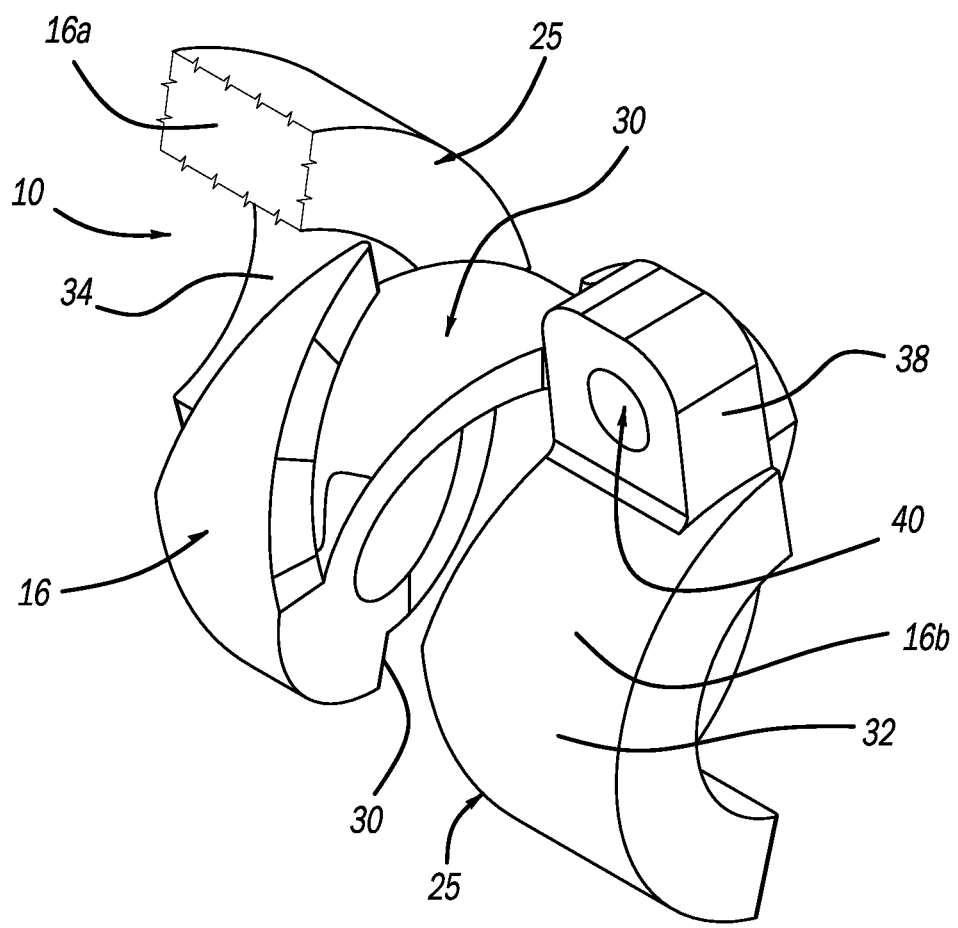
FIG. 6 is a perspective view of the clamp of FIG. 1 with another one of its legs hidden for clarity.

With reference to FIG. 6, the second leg 16 has an arcuate shape and is resiliently flexible. Stated differently, the second leg 16 has a helical shape formed by a plurality of continuous windings 25 arranged in series. In some forms, the plurality of continuous windings 25 include at least two windings forming at least two revolutions about the central axis A of the clamp 10 or substantially two revolutions. The second leg 16 also includes a proximal end 16a and a distal end 16b that is spaced apart from the proximal end 16a along an axial direction of the central axis A. In the example illustrated, the proximal end 16a extends from the proximal end 14a of the first leg 14 such that the first and second legs 14, 16 are one piece. In some forms, the first leg 14 and the second leg 16 may be separate parts that are secured to each other using fasteners, or any other suitable attachment means that allow the first and second legs 14, 16 to move independent of each other (e.g., welding, brazing, adhesive). In the example illustrated, the helical shaped second leg 16 includes a constant helical pitch from the proximal end 16a to the distal end 16b. In some forms, the helical shaped second leg 16 may include a variable pitch similar to the variable pitch described above with respect to the first leg 14.

With reference to FIG. 6, the second leg 16 also includes a plurality of grooves 30 formed therein between the proximal end 16a and the distal end 16b. In this way, the second leg 16 has a variable thickness from the proximal end 16a to the distal end 16b. In the example illustrated, a circumferential surface of each winding 25 of the second leg 16 includes at least one groove 30 formed therein. The grooves 30 may be formed at different locations of the windings 25. That is, one groove 30 may be formed in one winding 25 of the second leg 16 at one location along the circumferential surface and another groove 30 may be formed in another winding 25 of the second leg 16 at another location along a circumferential surface that is different from the location of the one winding 25. A groove 30 may optionally span more than one of the windings 25, such as portions of adjacent windings 25. In the example illustrated, the circumferential surface is an outer circumferential surface referred to herein as an outer surface 32. In other words, the plurality of grooves 30 are formed in the outer surface 32 of the windings 25 of the second leg 16 that faces away from the pipe assembly 12. In some forms, the plurality of grooves 30 may be formed in an inner circumferential surface (i.e., an inner surface 34) of the windings 25 of the second leg 14 that faces the pipe assembly 12. It should be understood that the first leg 14 and the second leg 16 cooperate to form a substantially cylindrical opening 36 that is coaxial with the central axis A (FIG. 4). The opening 36 receives the first pipe 12a and the second pipe 12b of the pipe assembly 12. In other words, the inner diameter of the inner surface 22 of the first leg 14 may be substantially equal to the inner diameter of the inner surface 34 of the second leg 16.

Portions of the second leg 16 are disposed within the plurality of grooves 20 of the first leg 14 and portions of the first leg 14 are disposed within the plurality of grooves 30 of the second leg 16 to interlock and intertwine the first and second legs 14, 16 to each other. More specifically, portions of the windings 25 of the second leg 16 are disposed within the plurality of grooves 20 of the first leg 14 to inhibit movement of the first leg 14 relative to the second leg 16. Similarly, portions of the windings 15 of the first leg 14 are disposed within the plurality of grooves 30 of the second leg 14 to inhibit movement of the second leg 16 relative to the first leg 14.

In the example provided, the grooves 20 and grooves 30 align such that the portions of the second leg 16 that include the grooves 30 are disposed within the plurality of grooves 20 of the first leg 14 and the portions of the first leg 14 that include the grooves 20 are disposed within the plurality of grooves 30 of the second leg 16 to interlock and intertwine the first and second legs 14, 16 to each other.

When the first and second legs 14, 16 are interlocked, the proximal end 14a of the first leg 14 and the proximal end 16a of the second leg 16 cooperate to define a circular shaped first axial end of the clamp 10, and the distal end 14b of the first leg 14 and the distal end 16b of the second leg 16 cooperate to define a circular shaped second axial end of the clamp 10. The interlocked first and second legs 14, 16 intertwine so as to provide a clamping force of the clamp 10 evenly over the surface area of the interface between the clamp 10 and the pipe assembly 12.

A tab 38 extends outward in a radial from the distal end 16b of the second leg 16 and includes an aperture 40 formed therein. The aperture 40 of the second leg 16 is aligned with the aperture 29 of the first leg 14. In this way, a threaded fastener 42 (FIGS. 2 and 4) may extend through the apertures 29, 40 of the first and second legs 14, 16, respectively, to clamp the first leg 14 and the second leg 16 to each other. A nut 44a and a washer 44b are secured to an end of the fastener 42. In some forms, one or both legs 14, 16 of the clamp 10 may include attachment structures (not shown) that are configured to secure the clamp to a fixed structure, for example (e.g., a wall of a warehouse). In this way, the pipe assembly 12 secured by the clamp 10 is further secured to the fixed structure.

Figure 8:
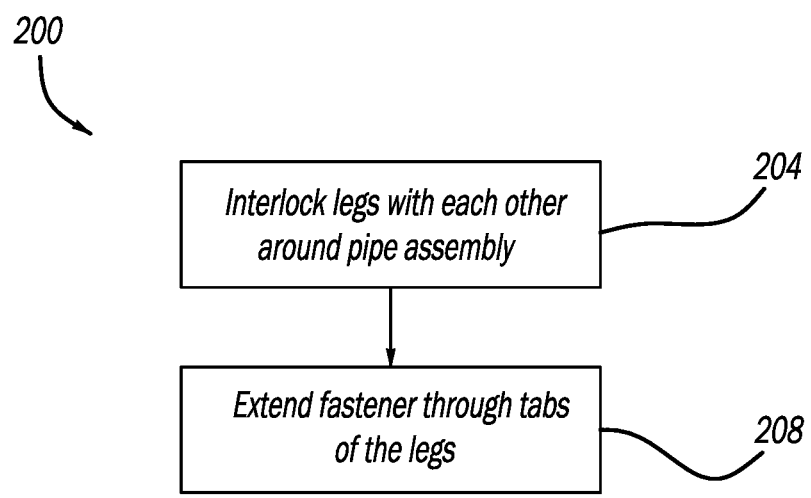
FIG. 8 is a flowchart illustrating a method for securing the clamp of FIG. 1 to the pipe assembly.

With continued reference to FIG. 8, a method 200 for securing the clamp 10 to the pipe assembly 12 will be described in detail. First, at 204, the first and second legs 14, 16 are interlock with each other (i.e., portions of the second leg 16 are disposed within the plurality of grooves 20 of the first leg 14 and portions of the first leg 14 are disposed within the plurality of grooves 30 of the second leg 16) around the pipe assembly 12. Next, at 208, the threaded fastener 42 extends through the tabs 28, 38 of the first and second legs 14, 16, respectively, and is tightened to further secure the clamp 10 to the pipe assembly 12.

The clamp 10 of the present disclosure provides the benefit of contacting a greater surface area of the pipe assembly 12. In this way, a clamping force of the clamp 10 is evenly distributed over a larger surface area of the pipe assembly 12 when secured to the pipe assembly 12. The clamp 10 being additively manufactured provides for the first and second legs 14, 16 of the clamp 10 to intertwine as disclosed herein as well as providing for the shapes and geometries formed in the clamp (e.g., the grooves 20, 30 formed in the legs 14, 16, respectively, of the clamp 10).

Figure 9:
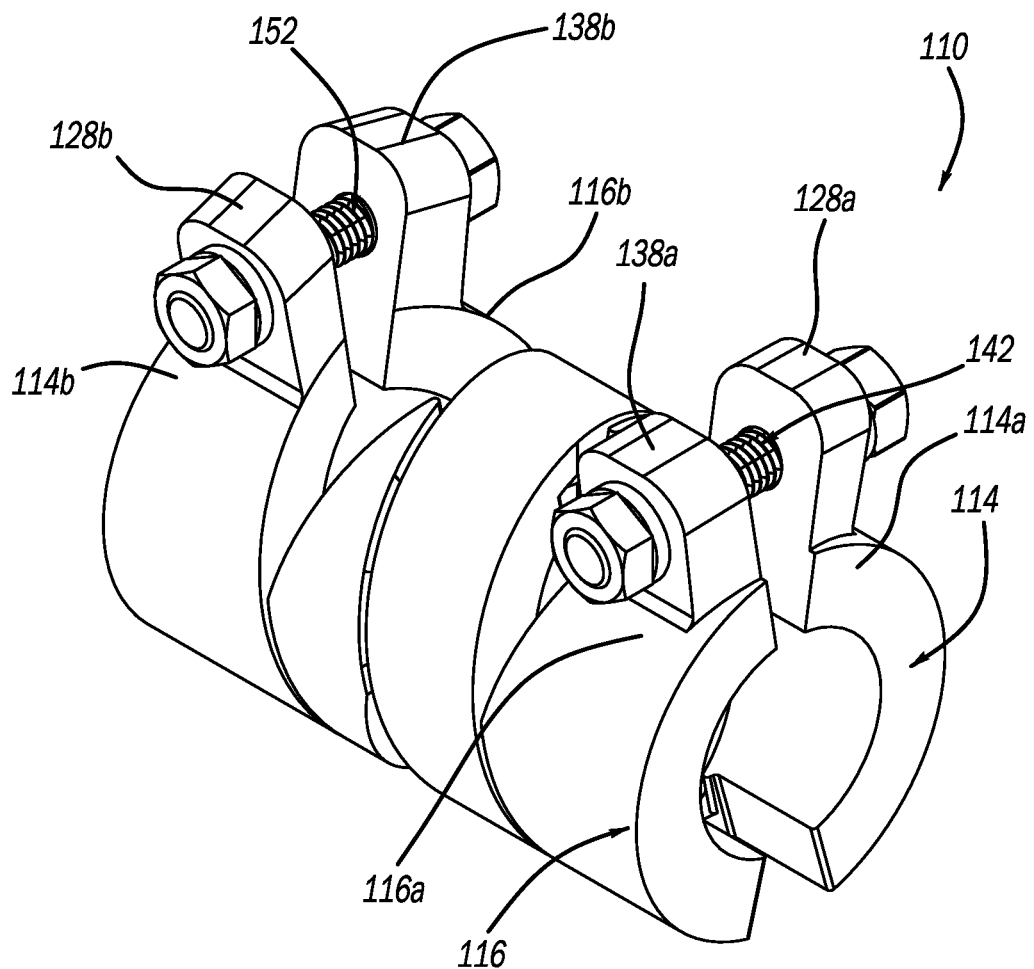
FIG. 9 is a perspective view of another clamp according to the principles of the present disclosure.

With reference to FIG. 9, another clamp 110 is provided. The clamp 110 may secure the pipe assembly 12 to each other. The structure and function of the clamp 110 may be similar or identical to the clamp 10 described above, apart for any exceptions noted below.

The clamp 110 includes a first leg 114 and a second leg 116 that may wrap around the pipe assembly 12 to secure the first pipe 12a of the pipe assembly 12 to the second pipe 12b of the pipe assembly 12. The first leg 114 is in the form of a single unitized, monolithic body that can be manufactured by an additive manufacturing process. In the example illustrated, the first leg 114 has a helical shape and is resiliently flexible. The first leg 114 also includes a first end 114a and a second end 114b that is spaced apart from the first end 114a along an axial direction of the central axis (not specifically shown). A first tab 128a extends outward in a radial from the first end 114a of the first leg 114 and includes an aperture formed therein. Similarly, a second tab 128b extends outward in a radial from the second end 114b of the first leg 114 and includes an aperture formed therein. The first leg 114 also includes a plurality of grooves (not shown) formed therein between the first end 114a and the second end 114b. The structure and function of the grooves may be similar or identical to that of the grooves 20 described above, and therefore, will not be described again in detail.

The second leg 116 is in the form of a single unitized, monolithic body that can be manufactured by an additive manufacturing process and is movable relative to the first leg 114 prior to being secured to the first leg 114. In the example illustrated, the second leg 116 has a helical shape and is resiliently flexible. The second leg 116 also includes a first end 116a and a second end 116b that is spaced apart from the first end 116a along an axial direction of the central axis. A first tab 138a extends outward in a radial from the first end 116a of the second leg 116 and includes an aperture formed therein. Similarly, a second tab 138b extends outward in a radial from the second end 116b of the second leg 116 and includes an aperture formed therein. The first tab 138a is adjacent the first tab 128a of the first leg 114 such that the aperture of the first leg 114 is aligned with the aperture of the second leg 116. Similarly, the second tab 138b is adjacent the second tab 128b of the first leg 114 such that the aperture of the first leg 114 is aligned with the aperture of the second leg 116.

A threaded fastener 142 may extend through the apertures of the first and second legs 114, 116 to secure the first and second legs 114, 116 to each other and to clamp the first and second legs 114, 116 around the pipe assembly 12. A nut and washer are secured to an end of the fastener 142. Similarly, a threaded fastener 152 may extend through the apertures of the first and second legs 114, 116 to further secure the first and second legs 114, 116 to each other and to further clamp the first and second legs 114, 116 around the pipe assembly 12. A nut and a washer are secured to an end of the fastener 152. The second leg 116 also includes a plurality of grooves (not shown) formed therein between the first end 116a and the second end 116b. The structure and function of the grooves may be similar or identical to that of the grooves 30 described above, and therefore, will not be described again in detail.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A clamp for a pipe, the clamp comprising:
a first leg having an arcuate shape disposed about a central axis of the clamp and including a first proximal end, a first distal end spaced apart from the first proximal end along an axial direction of the central axis, and at least one first groove formed in a first surface of the first leg between the first proximal end and the first distal end; and
a second leg having an arcuate shape disposed about the central axis and including a second proximal end proximate the first proximal end of the first leg and a second distal end proximate the first distal end of the first leg, the second distal end spaced apart from the second proximal end along the axial direction of the central axis,
wherein a portion of the second leg is disposed within the at least one first groove of the first leg to interlock the first and second legs to each other.

2. The clamp of claim 1, wherein the first leg and the second leg are movable independent of each other.

3. The clamp of claim 1, wherein each of the first and second legs includes at least two revolutions about the central axis of the clamp.

4. The clamp of claim 1, wherein the first proximal end extends from the second proximal end.

5. The clamp of claim 4, wherein a first tab extends outward from the first distal end and a second tab extends outward from the second distal end.

6. The clamp of claim 5, further comprising a fastener extending through the first tab and the second tab.

7. The clamp of claim 1, wherein:
a first tab extends outward from the first distal end and a second tab extends outward from the second distal end; and
a third tab extends outward from the first proximal end and a fourth tab extends outward from the second proximal end.

8. The clamp of claim 7, further comprising:
a first fastener extending through the first tab and the second tab; and
a second fastener extending through the third tab and the fourth tab.

9. The clamp of claim 1, wherein each of the first and second legs includes a variable thickness.

10. The clamp of claim 1, wherein each of the first and second legs is a resiliently flexible.

11. The clamp of claim 1, wherein a first inner surface of the first leg and a second inner surface of the second leg cooperate to form a substantially cylindrical opening coaxial with the central axis.

12. The clamp of claim 1, wherein at least one second groove is formed in a second surface of the second leg between the second proximal end and the second distal end, and wherein a portion of the first leg is disposed within the at least one second groove to further interlock the first and second legs to each other.

13. A clamp for a pipe, the clamp comprising:
a first leg having a first helical shape and including a first proximal end, a first distal end, and a plurality of first grooves formed in a first surface of the first leg between the first proximal end and the first distal end; and
a second leg having a second helical shape and including a second proximal end proximate the first proximal end of the first leg, a second distal end proximate the first distal end of the first leg, and a plurality of second grooves formed in a second surface of the second leg between the second proximal end and the second distal end,
wherein portions of the second leg are disposed within the plurality of first grooves and portions of the first leg are disposed within the plurality of second grooves to interlock the first and second legs to each other.

14. The clamp of claim 13, wherein each of the first and second legs includes at least two revolutions about a central axis of the clamp.

15. The clamp of claim 13, wherein the first proximal end extends from the second proximal end.

16. The clamp of claim 15, wherein a first tab extends outward from the first distal end and a second tab extends outward from the second distal end.

17. The clamp of claim 16, further comprising a fastener extending through the first tab and the second tab.

18. The clamp of claim 13, wherein the plurality of first grooves are formed in an inner surface of the first leg; and wherein the plurality of second grooves are formed in an outer surface of the second leg.

19. The clamp of claim 13, wherein each of the first and second legs includes a constant helical pitch.

20. A clamp for a pipe, the clamp comprising:
a first leg having a first helical shape and including a first proximal end, a first distal end, and a plurality first grooves formed in an inner surface of the first leg between the first proximal end and the first distal end, the first leg further includes a first tab extending outward from the first distal end;
a second leg having a second helical shape and including a second proximal end extending from the first proximal end of the first leg, a second distal end proximate the first distal end of the first leg, and a plurality of second grooves formed in an outer surface of the second leg between the second proximal end and the second distal end, the second leg further includes a second tab extending outward from the second distal end; and
a fastener extending through the first tab and the second tab,
wherein portions of the second leg are disposed within the plurality of first grooves and portions of the first leg are disposed within the plurality of second grooves to interlock the first and second legs to each other.

* * * * *